US008713582B2

(12) United States Patent
Archer et al.

(10) Patent No.: US 8,713,582 B2
(45) Date of Patent: Apr. 29, 2014

(54) PROVIDING POLICY-BASED OPERATING SYSTEM SERVICES IN AN OPERATING SYSTEM ON A COMPUTING SYSTEM

(75) Inventors: Charles J. Archer, Rochester, MN (US); Michael A. Blocksome, Rochester, MN (US); Joseph D. Ratterman, Rochester, MN (US); Albert Sidelnik, Saint Paul, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2249 days.

(21) Appl. No.: 11/553,040

(22) Filed: Oct. 26, 2006

(65) Prior Publication Data
US 2008/0148355 A1    Jun. 19, 2008

(51) Int. Cl.
*G06F 9/54* (2006.01)

(52) U.S. Cl.
USPC ........................................................ 719/319

(58) Field of Classification Search
USPC ........................................................ 719/319
See application file for complete search history.

(56) References Cited

U.S. PATENT DOCUMENTS

| | | | |
|---|---|---|---|
| 4,860,201 A | 8/1989 | Stolfo et al. | |
| 4,910,669 A | 3/1990 | Gorin et al. | |
| 5,063,562 A | 11/1991 | Barzilai et al. | |
| 5,095,444 A | 3/1992 | Motles | |
| 5,491,691 A | 2/1996 | Shtayer et al. | |
| 5,651,099 A | 7/1997 | Konsella | |
| 5,815,793 A | 9/1998 | Ferguson | |
| 5,826,262 A | 10/1998 | Bui et al. | |
| 5,826,265 A | 10/1998 | Van Huben et al. | |
| 5,859,981 A | 1/1999 | Levin et al. | |
| 5,862,381 A | 1/1999 | Advani et al. | |
| 5,875,190 A | 2/1999 | Law | |
| 5,912,893 A | 6/1999 | Rolfe et al. | |
| 5,918,020 A | 6/1999 | Blackard et al. | |
| 5,937,201 A | 8/1999 | Matsushita et al. | |
| 5,953,336 A | 9/1999 | Moore et al. | |
| 5,982,771 A | 11/1999 | Caldara et al. | |
| 6,006,032 A | 12/1999 | Blandy et al. | |
| 6,047,122 A | 4/2000 | Spiller | |

(Continued)

OTHER PUBLICATIONS

Bershad et al. SPIN—An Extensible Microkernel for Application-Specific Operating System Services. ACM SIGOPS Operating System Review. vol. 29, Issue 1 (Jan. 1995). pp. 74-77.*

(Continued)

*Primary Examiner* — H S Sough
*Assistant Examiner* — Brian W Wathen
(74) *Attorney, Agent, or Firm* — Biggers Kennedy Lenart Spraggins, LLP

(57) ABSTRACT

Methods, apparatus, and products are disclosed for providing policy-based operating system services in an operating system on a computing system. The computing system includes at least one compute node. The compute node includes an operating system that includes a kernel and a plurality of operating system services of a service type. Providing policy-based operating system services in an operating system on a computing system includes establishing, on the compute node, a kernel policy specifying one of the operating system services of the service type for use in the operating system, and accessing, by the kernel, the specified operating system service. The computing system may also be implemented as a distributed computing system that includes one or more operating system service nodes. One or more of the operating system services may be distributed among the operating system service nodes.

16 Claims, 6 Drawing Sheets

(56) References Cited

U.S. PATENT DOCUMENTS

| | | | |
|---|---|---|---|
| 6,057,839 A | 5/2000 | Advani et al. |
| 6,101,495 A | 8/2000 | Tsuchida et al. |
| 6,115,357 A | 9/2000 | Packer et al. |
| 6,118,777 A | 9/2000 | Sylvain |
| 6,126,331 A | 10/2000 | Komatsu et al. |
| 6,253,372 B1 | 6/2001 | Komatsu et al. |
| 6,336,143 B1 | 1/2002 | Diedrich et al. |
| 6,438,702 B1 | 8/2002 | Hodge |
| 6,490,566 B1 | 12/2002 | Schmidt |
| 6,493,637 B1 | 12/2002 | Steeg |
| 6,563,823 B1 | 5/2003 | Przygienda et al. |
| 6,600,721 B2 | 7/2003 | Edholm |
| 6,633,937 B2 | 10/2003 | Thomson |
| 6,836,480 B2 | 12/2004 | Basso et al. |
| 6,839,829 B1 | 1/2005 | Daruwalla et al. |
| 6,952,692 B1 | 10/2005 | Bhattiprolu et al. |
| 7,054,948 B2 | 5/2006 | Rhodes |
| 7,197,577 B2 | 3/2007 | Nellitheertha |
| 7,216,217 B2 | 5/2007 | Hansen et al. |
| 7,301,541 B2 | 11/2007 | Hansen et al. |
| 7,509,244 B1 | 3/2009 | Shakeri et al. |
| 7,527,558 B2 | 5/2009 | Lavoie et al. |
| 7,634,388 B2 | 12/2009 | Archer et al. |
| 7,673,011 B2 | 3/2010 | Archer et al. |
| 7,738,443 B2 | 6/2010 | Kumar |
| 2002/0065930 A1 | 5/2002 | Rhodes |
| 2002/0143911 A1 | 10/2002 | Vicente et al. |
| 2003/0021287 A1 | 1/2003 | Lee et al. |
| 2003/0074142 A1 | 4/2003 | Steeg |
| 2004/0015494 A1 | 1/2004 | Basso et al. |
| 2004/0098373 A1 | 5/2004 | Bayliss et al. |
| 2004/0111398 A1 | 6/2004 | England et al. |
| 2005/0060462 A1* | 3/2005 | Ota ............................ 710/260 |
| 2005/0182834 A1 | 8/2005 | Black |
| 2006/0059196 A1 | 3/2006 | Sato et al. |
| 2006/0203739 A1 | 9/2006 | Padmanabhan et al. |
| 2006/0292292 A1 | 12/2006 | Brightman et al. |
| 2007/0016589 A1 | 1/2007 | Hara et al. |
| 2007/0070897 A1 | 3/2007 | Doyle et al. |
| 2007/0179760 A1 | 8/2007 | Smith |
| 2008/0109569 A1 | 5/2008 | Leonard et al. |
| 2008/0126739 A1 | 5/2008 | Archer et al. |
| 2008/0148355 A1 | 6/2008 | Archer et al. |
| 2008/0240115 A1 | 10/2008 | Briscoe et al. |
| 2008/0313376 A1 | 12/2008 | Archer et al. |
| 2008/0313661 A1 | 12/2008 | Blocksome et al. |
| 2009/0003344 A1 | 1/2009 | Kumar |
| 2009/0089328 A1 | 4/2009 | Miller et al. |
| 2009/0113308 A1 | 4/2009 | Almasi et al. |
| 2009/0138892 A1 | 5/2009 | Almasi et al. |

OTHER PUBLICATIONS

Bershad et al. SPIN—An Extensible Microkernel for Application-Specific Operating System Services. Technical Report 94-03-03 (Feb. 28, 1994). pp. 1-16. [Retrieved from:http://www-spin.cs.washington.edu/papers/index.html on Nov. 23, 2009].*

Hollingworth, D.; Redmond, T.; Rice, R. Security Policy Realization in an Extensible Operating System. Proceedings of DARPA Information Survivability COnference and Exposition. DISCEX '00 (Jan. 25-27, 2000). vol. 1, pp. 320-334.*

Bershad et al. SPIN—An Extensible Microkernel for Application-Specific Operating System Services. Technical Report 94-03-03 (Feb. 28, 1994). pp. 1-16. [Retrieved from: http://www-spin.cs.washington.edu/papers/index.html on Nov. 23, 2009].

Hollingworth, D.: Redmond, T.; Rice, R. Security Policy Realization in an Extensible Operating System. Proceedings of DARPA Information Survivability Conference and Exposition. DISCEX '00 (Jan. 25-27, 2000). vol. 1. pp. 320-334.

"Windows Native Processor Performance Control", Windows Platform Design Notes—Designing Hardware for the Microsoft Windows Family of Operating Systems, Nov. 12, 2002.

Office Action Dated Dec. 10, 2009 in U.S. Appl. No. 11/553,040.

Office Action Dated Oct. 3, 2008 in U.S. Appl. No. 11/531,846.

Final Office Action Dated Mar. 2, 2009 in U.S. Appl. No. 11/531,846.

Office Action Dated Jul. 31, 2009 in U.S. Appl. No. 11/531,846.

Office Action Dated Apr. 29, 2009 in U.S. Appl. No. 11/764,282.

Final Office Action Dated Dec. 8, 2009 in U.S. Appl. No. 11/764,282.

Notice of Allowance Dated Oct. 13, 2009 in U.S. Appl. No. 11/837,015.

Chan, Ernie et al. "Collective Communication on Architectures that Support Simultaneous Communication over Multiple Links", PPoPP'06, Mar. 29-31, 2006, New York, New York, USA, pp. 2-11.

Mao, Weizhen et al. "One-To-All Personalized Communication in Torus Networks", Proceedings of the $25^{th}$ IASTED International Multi-Conference: parallel and distributed computing networks, Innsbruck, Austria, 2007, pp. 291-296.

Almasi, George et al. "Optimization of MPI Collective Communication on BlueGene/L Systems", ICS'05, Jun. 20-22, 2005, Boston, MA, USA, 2005, pp. 253-262.

Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.

Stankovic at al.; "Visual Programming for Message-Passing Systems", (1999), International Journal of Software Engineering and Knowledge Engineering, Sydney, Australia.

Sottile et al.; "Performance Analysis of Parallel Programs Via Message-Passing Graph Traversal", College of Computing, Georgia Institute of Technology, Feb. 25, 2006.

Notice of Allowance of U.S. Appl. No. 11/531,846, mailed Apr. 6, 2010.

Final Office Action of U.S. Appl. No. 11/553,040, mailed Apr. 29, 2010.

Office Action of U.S. Appl. No. 11/764,282, mailed Jul. 12, 2010.

Office Action of U.S. Appl. No. 12/180,963, mailed May 3, 2010.

Office Action of U.S. Appl. No. 11/946,136, mailed Nov. 24, 2010.

Office Action of U.S. Appl. No. 11/924,934, mailed Aug. 19, 2010.

Notice of Allowance of U.S. Appl. No. 11/764,282, mailed Dec. 10, 2010.

Office Action of U.S. Appl. No. 11/832,192, mailed Oct. 29, 2010.

Office Action of U.S. Appl. No. 12/166,748, mailed May 27, 2010.

Office Action of U.S. Appl. No. 12/166,748, mailed Aug. 25, 2010.

Notice of Allowance of U.S. Appl. No. 12/180,963, mailed Oct. 20, 2010.

Notice of Allowance of U.S. Appl. No. 11/553,095, mailed Apr. 8, 2009.

Office Action of U.S. Appl. No. 11/553,095, mailed Jun. 13, 2008.

Nenad Stankovic Kang Zhang, Visual Programming for Message-Passing Systems (1999), International Journal of Software Engineering and Knowledge Engineering.

Matthew J. Sottile, Vaddadi P. Chandu, David A. Bader, Performance analysis of parallel programs via message-passing graph traversal, College of Computing, Georgia Institute of Technology, Feb. 25, 2006.

Smith et al., "Virtual Machines: Versatile Platforms for Systems and Processes", Jun. 3, 2005, pp. 458-470, 474, 475, 554, & 580-585, Morgan Kaufmann Publishing, USA.

Campbell et al., "A Quality of Service Architecture", Newsletter, ACM SIGCOMM Computer Communication Review, Apr. 1994, pp. 6-27, vol. 24, Issue 2, ACM New York, NY, USA.

* cited by examiner

PROVIDING POLICY-BASED OPERATING SYSTEM SERVICES IN AN OPERATING SYSTEM ON A COMPUTING SYSTEM

CROSS-REFERENCE TO RELATED APPLICATIONS

This application is related to U.S. patent application, Ser. No. 11/553,077 entitled "PROVIDING POLICY-BASED OPERATING SYSTEM SERVICES IN A HYPERVISOR ON A COMPUTING SYSTEM", filed on Oct. 26, 2006; U.S. patent application, Ser. No. 11/553,095 entitled "PROVIDING POLICY-BASED OPERATING SYSTEM SERVICES IN AN OPERATING SYSTEM ON A COMPUTING SYSTEM", filed on Oct. 26, 2006; and U.S. patent application, Ser. No. 11/553,101 entitled "PROVIDING POLICY-BASED APPLICATION SERVICES TO AN APPLICATION RUNNING ON A COMPUTING SYSTEM", filed on Oct. 26, 2006; all of which are incorporated by reference herein.

BACKGROUND OF THE INVENTION

1. Field of the Invention

The field of the invention is data processing, or, more specifically, methods, apparatus, and products for providing policy-based operating system services in an operating system on a computing system.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is the operating system. Early computers lacked any form of operating system. A system administrator loaded an application that had sole use of the machine. To operate the computer, an application had to directly access and control the computer hardware. Later, computers came with libraries of support code which were linked into an application to assist in operations such as input and output. These libraries were the genesis of the modern-day operating system. The computers, however, still ran only a single application at a time. Modern operating systems are capable of running multiple applications simultaneously. These modern operating systems also provide applications with abstractions of the computer hardware to simplify application development and aid the ability to port applications from one hardware platform to another.

The kernel is the central part in most computer operating systems which manages the system's resources and the communication between hardware and software components. As a basic component of an operating system, a kernel provides abstraction layers for hardware, especially for memory, processors and I/O that allows hardware and software to communicate. The kernel also makes these facilities available to applications and other operating system services through inter-process communication mechanisms and system calls.

These kernel tasks are performed differently for different kernels, depending on their design and implementation. In a monolithic kernel, all operating system services reside in and are executed using the same memory area. Because a monolithic kernel attempts to execute all the code in the same address space, monolithic kernel architectures are easier to design and implement than other solutions and are extremely efficient if well-written. The main disadvantages of monolithic kernels are the dependencies between system components. Large kernels become very difficult to maintain, and a bug in one portion of the kernel may crash the entire system.

In a microkernel architecture, the kernel provides simple abstractions over the hardware, with a set of primitives or system calls to implement minimal operating system services such as, for example, memory management, multitasking, and inter-process communication. Other services, including those normally provided by the kernel such as, for example, networking, are implemented in user-space programs that typically have their own address space. Microkernels are easier to maintain than monolithic kernels, but the large number of system calls and context switches may slow down the system.

Regardless of the kernel architecture used to implement an operating system, the set of operating system services provided in current operating systems are generally fixed when the operating system is installed. That is, the operating system utilizes the same memory management algorithm, the same I/O scheduling algorithm, the same networking algorithm, and so on, without regard to the applications that run on the hardware managed by the operating system. Often, however, one application may efficiently utilize computer resources when using one operating system service, while another application inefficiently utilizes computer resources when using the same operating system service. For example, an operating system service that provides I/O scheduling in the operating system may result in efficient use of computer resources for an application that are I/O intensive and result in an inefficient use of computer resources for an application that is not I/O intensive. Because current operating systems provide the same operating system services without regard to applications, current operating systems often do not efficiently manage the interaction between applications and the computer hardware. Readers will therefore appreciate that room for improvement exists in the manner in which operating system service are provided in an operating system.

SUMMARY OF THE INVENTION

Methods, apparatus, and products are disclosed for providing policy-based operating system services in an operating system on a computing system. The computing system includes at least one compute node. The compute node includes an operating system that includes a kernel and a plurality of operating system services of a service type. Providing policy-based operating system services in an operating system on a computing system includes establishing, on the compute node, a kernel policy specifying one of the operating system services of the service type for use in the operating system, and accessing, by the kernel, the specified operating system service.

The computing system may also be implemented as a distributed computing system that includes one or more operating system service nodes. One or more of the operating system services may be distributed among the operating system service nodes. The kernel policy may also specify an operating system service node that is to provide the specified operating system service, and accessing, by the kernel, the specified operating system service may include accessing, by the kernel, the specified operating system service of the operating system service node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
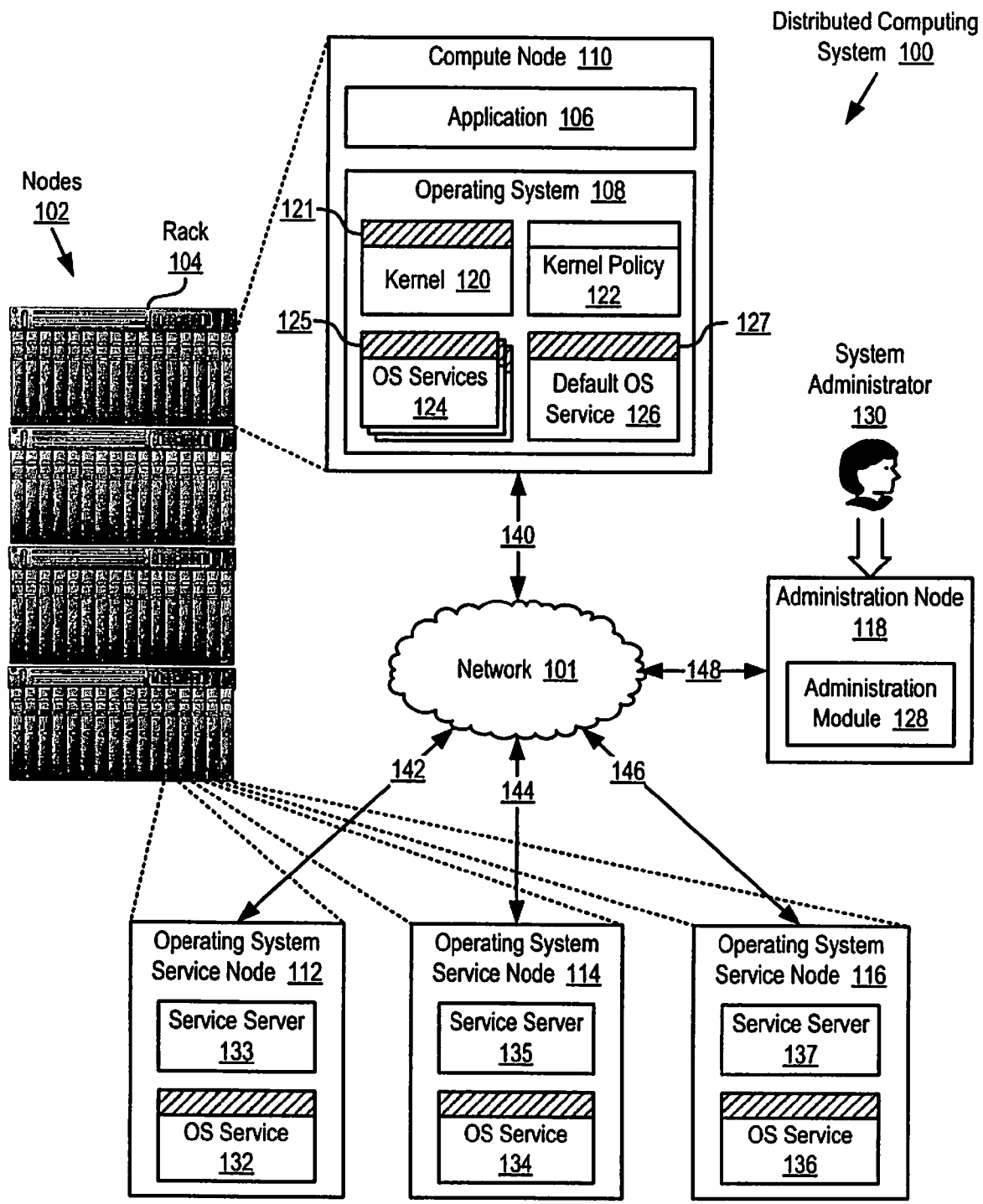
FIG. 1 sets forth a network diagram illustrating an exemplary computing system for providing policy-based operating system services in an operating system according to embodiments of the present invention.

Exemplary methods, apparatus, and products for providing policy-based operating system services in an operating system on a computing system according to embodiments of the present invention are described with reference to the accompanying drawings, beginning with FIG. 1. FIG. 1 sets forth a network diagram illustrating an exemplary computing system (100) for providing policy-based operating system services in an operating system according to embodiments of the present invention. The exemplary computing system (100) of FIG. 1 includes a compute node (110). The compute node (110) includes an operating system (108). The operating system (108) includes a kernel (120) and a plurality of operating system services (124) of a service type. The exemplary computing system (100) of FIG. 1 operates generally to provide policy-based operating system services in an operating system according to embodiments of the present invention by establishing, on the compute node, a kernel policy (122) specifying one of the operating system services (124) of the service type for use in the operating system (108) and accessing, by the kernel (120), the specified operating system service.

In the example of FIG. 1, the exemplary computing system (100) is implemented as a distributed computing system. A distributed computing system is a computing system that uses two or more network connected computing devices to accomplish a common task. The distributed computer system (100) of FIG. 1 includes the compute node (110), operating system service nodes (112, 114, 116), and an administration node (118) connected together for data communications through network (101). The compute node (110) connects to network (101) through wireline connection (140). The operating system service node (112) connects to network (101) through wireline connection (142). The operating system service node (114) connects to network (101) through wireline connection (144). The operating system service node (116) connects to network (101) through wireline connection (146). The administration node (118) connects to network (101) through wireline connection (148). The common task in the distributed computing system (100) of FIG. 1 includes providing a policy-based operating system services in an operating system according to embodiments of the present invention.

In the example of FIG. 1, the compute node (110) is implemented using one of the nodes (102) installed in a computer rack (104). Each node (102) of FIG. 1 is a processing device that executes computer program instructions. Each node (102) includes one or more computer processors and computer memory operatively coupled to the computer processors. The nodes (102) of FIG. 1 are implemented as blade servers installed in server chassis that are, in turn, mounted on the computer rack (104). Readers will note, however, that implementing the nodes as blade servers is for explanation and not for limitation. In fact, the nodes of FIG. 1 may be implemented as network connected workstations, computers connected together to form a computer cluster, computing devices in a parallel computer, or any other implementation as will occur to those of skill in the art.

In the example of FIG. 1, the compute node (110) is a node configured with a kernel (120) and a kernel policy (122) useful in providing policy-based operating system services in an operating system on a computing system according to embodiments of the present invention. Typically, the kernel policy (122) is established on the compute node to optimize the utilization of node resources by an application (106) configured for execution on the node. The application (106) is a set of computer program instructions implementing user-level data processing. The application may be a stand-alone application in which all the computer program instructions of the application (106) are executed on a single compute node, or the application (106) may be a distributed application in which portions of the computer program instructions are executed serially or in parallel with other portions of the computer program instructions being executed on other compute nodes.

In the exemplary system (100) of FIG. 1, the operating system (108) controls the execution of the application (106) on the compute node (110). The operating system (108) of FIG. 1 is system software that manages the hardware and software resources of a processing device such as the compute node (110). The operating system (108) performs basic tasks such as, for example, controlling and allocating memory, prioritizing the processing of instructions, controlling input and output devices, facilitating networking, and managing files.

The application (106) of FIG. 1 accesses resources provided by the operating system (108) through the kernel (120). The kernel (120) is the core component of the operating system (108) that manages the system's resources and the communication between hardware and software components. The kernel (120) provides software applications with abstraction layers for hardware that allow hardware and software to communicate. The kernel (120) makes these abstraction layers available to user-level applications and other operating system components through inter-process communication mechanisms and a kernel application programming interface ('API') (121).

In the exemplary system (100) of FIG. 1, the operating system (108) is implemented using a microkernel architecture. That is, the kernel (120) includes implementations of basic types of operating system services such as memory management, process management, and inter-process communication. Other operating system services (124) such as, for example, networking, interrupt handling, I/O scheduling, device drivers, file system services, and so on, however, are implemented using separate operating system components, each component having a thread of execution distinct from the kernel (120). The kernel (120) accesses these operating system services (124) using inter-process communication or a system call to the service's API (125). In the exemplary system (100) of FIG. 1, each operating system service (124) is system software that either implements a service type not implemented in the kernel (120) itself or implements a specialized version of a service type already provided by the kernel (120). For explanation, consider, for example, that the kernel (120) of FIG. 1 does not implement any services of the file system service type. In such an example, one of the operating system services (124) may implement a file system service for the Unix File System, while a second operating system service (124) may implement a file system service for the Reiser File System. Depending on the kernel policy (122) configured in the operating system (108), the kernel (120) would provide file system services using either the Unix File System or the Reiser File System. Consider, further for example, that the kernel (120) of FIG. 1 implements a generic memory management service. In such an example, one of the operating system services (124) may implement a memory management service tailored for intensive I/O operations that the kernel (120) may use instead of the generic memory management algorithm implemented in the kernel (120) depending on the configuration of the kernel policy (122).

Each operating system service (124) of FIG. 1 provides an operating system service of a particular service type. The types of service provided by the operating system services (124) may include, for example, task schedulers, file systems, memory management, device drivers, I/O schedulers, interrupt/signal handling, security, job submission, tty handling, and so on. The operating system services for services of the same service type have a same application programming interface. That is, the service API (125) for each service (124) of a particular service type have the same set of member methods and parameters that the kernel (120) may use to access the operating system services (124). Because the services of each service type have the same service API, the kernel (120) may access the operating system service specified in the kernel policy (122) using the same application programming interface regardless of which operating system service is specified in the kernel policy (122) for the particular service type.

In the exemplary system (100) of FIG. 1, one or more of the operating system services (124) are distributed among the operating system service nodes (112, 114, 116). That is, the computer program instructions for implementing one or more of the operating system services (124) reside on the operating system service nodes (112, 114, 116). The corresponding operating system services (124) for each of the services (132, 134, 136) may be implemented as copies of the computer program instructions implementing each of the services (132, 134, 136). The corresponding operating system services (124) for each of the services (132, 134, 136) may also be implemented using a data communications subsystem that accesses the operating system services (132, 134, 136) on the operating system service nodes (112, 114, 116). Examples of such a data communication subsystem may include a web services engine, a CORBA object on the compute node (110) that accesses the operating system services (132, 134, 136) on the operating system service nodes (112, 114, 116) using remote procedure calls, use of an MPI library, or any other implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional remote procedure calls. CORBA uses a declarative language, the Interface Definition Language ('IDL'), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

'MPI' refers to 'Message Passing Interface,' a prior art parallel communications library, a module of computer program instructions for data communications on parallel computers. Examples of prior-art parallel communications libraries that may be useful for providing policy-based operating system services in an operating system on a computing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among nodes running a parallel program on a distributed memory parallel computer. This specification sometimes uses MPI terminology for ease of explanation, although the use of MPI as such is not a requirement or limitation of the present invention.

In the example of FIG. 1, the operating system service nodes (112, 114, 116) are implemented using the nodes (102) installed in the computer rack (104). Each operating system service node (112, 114, 116) is a node that provides operating system services to a kernel installed on a compute node. Each operating system service node may provide one or more operating system services to one or more kernels running on one or more compute nodes. In distributed computing systems with many nodes, however, each operating system service node typically provides only one operating system service due to the abundance of nodes in the system. In the example of FIG. 1, the operating system service node (112) provides operating system service (132) to kernel (120); the operating system service node (114) provides operating system service (134) to kernel (120); and the operating system service node (116) provides operating system service (136) to kernel (120).

To provide operating system services to the kernel (120), each operating system service node (112, 114, 116) of FIG. 1 has installed upon it an operating system service server. The operating system service node (112) includes service server (133), the operating system service node (114) includes service server (135), and the operating system service node (116) includes service server (137). Each service server (133, 135, 137) is a software component that provides an operating system service to a kernel in response to a request sent by a kernel of an operating system or in response to receiving an instruction from a system administrator. Each operating system service server (133, 135, 137) may provide an operating system service to a kernel by transmitting the computer program instructions implementing the requested operating system service to the kernel and allowing the compute node on which the kernel is installed to execute the computer program instructions. Each operating system service server (133, 135, 137) may also provide an operating system service by instructing the operating system service node of the server to execute the computer program instructions implementing the requested operating system service. The kernel (120) may communicate with the operating system service servers (133, 135, 137) using web services, calling member methods of a CORBA object, use of an MPI library, or any other data communications implementation as will occur to those of skill in the art.

As mentioned above, the operating system (108) includes two or more operating system services (124) for a particular service type. For example, the operating system (108) may include two different implementations of file system services for use by the kernel depending on the configuration of the exemplary system (100). In another example, the operating system (108) may include two different implementations of memory management services depending on the needs of the application (106). Having more than one operating system service for a particular service type advantageously provides the flexibility to optimize the operating system's service algorithms according to the hardware and software environment that the operating system (108) manages.

The kernel policy (122) of FIG. 1 is a table that maps one of the operating system services (124) to a type of operating system service used by the kernel (120). The kernel (120) uses the kernel policy (122) to identify which operating system service to use in the operating system for a particular service type. Regardless of whether the operating system services (124) reside locally on the compute node (110) or are distributed on other nodes such as operating system service nodes (112, 114, 116), the kernel policy (122) specifies one of the operating system services of a particular service type for use in the operating system (108). When the operating system service specified in the kernel policy is distributed on one of the operating system service nodes (112, 114, 116), the kernel policy (122) also specifies an operating system service node that is to provide the specified operating system service. Using the kernel policy (122), the kernel (120) provides policy-based operating system services in an operating system on a computing system according to embodiments of the present invention by accessing the operating system service specified in the policy (122).

Often the kernel policy (122) will not specify an operating system service for one of the service types used in the operating system (108) or the kernel (120) will be unable to access the operating system service specified in the policy (122). In the example of FIG. 1, the operating system (108) therefore includes a default operating system service (126). The default operating system service (126) is an operating system service of a particular service type that the kernel (120) may use when the kernel policy (122) does not specify an operating system service for the particular service type or the kernel (120) is unable to access the operating system service specified in the policy (122). Consider, for example, that the kernel policy (122) does not specify a file system service for use by the operating system (108), that the kernel (120) does not implement a file system service itself, and that the default operating system service implements the Unix File System. Because the kernel (120) does not implement a file system service and no file system service is specified in the kernel policy (122), the kernel (120) in such an example will use the default operating system service (126) implementing the Unix File System. The kernel (120) may access the default operating system service (126) using inter-process communication or the default operating system service API (127).

In the example of FIG. 1, the distributed computing system (100) is configured by a system administrator (130) through an administration node (118). The administration node (118) of FIG. 1 is a computing device that administers the configuration of the computing system (100) of FIG. 1. The administration node (118) may be implemented as one of the nodes (102) installed in the rack (104), a workstation network connected to the nodes (102), or any other computer as will occur to those of skill in the art.

In the exemplary system (100) of FIG. 1, the administration module (118) has installed upon it an administration module (128). The administration module (128) is a software component through which a system administrator (130) configures the exemplary computer system (100). The administration module (128) allows a system administrator (130) to configure the exemplary computer system (100) by providing a user interface for the system administrator (130) to interact with the administration module (128) and by configuring operating system (108) and the application (106) provided by the system administrator (130) on one or more compute nodes such as, for example, the compute node (110). The administration module (128) includes a set of computer program instructions for providing policy-based operating system services in an operating system on a computing system by establishing, on the compute node (110), a kernel policy specifying one of the operating system services (124) of a service type for use in the operating system (108) according to embodiments of the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), the MPI protocol, and others as will occur to those of skill in the art. Various embodiments of the present invention may be implemented on a variety of hardware platforms in addition to those illustrated in FIG. 1. For example, the computing system useful for providing policy-based operating system services in an operating system according to embodiments of the present invention may also be implemented as a parallel computer such as, for example, IBM's BlueGene/L.

Providing policy-based operating system services in an operating system on a computing system in accordance with the present invention is generally implemented with computers, that is, with automated computing machinery. In the system of FIG. 1, for example, all the nodes are implemented to some extent at least as computers. For further explanation, therefore, FIG. 2 sets forth a block diagram of automated computing machinery comprising an exemplary compute node (110) useful in providing policy-based operating system services in an operating system on a computing system according to embodiments of the present invention. The compute node (110) of FIG. 2 includes at least one computer processor (156) or 'CPU' as well as random access memory (168) ('RAM') which is connected through a high speed memory bus (166) and bus adapter (158) to processor (156) and to other components of the compute node.

Figure 2:
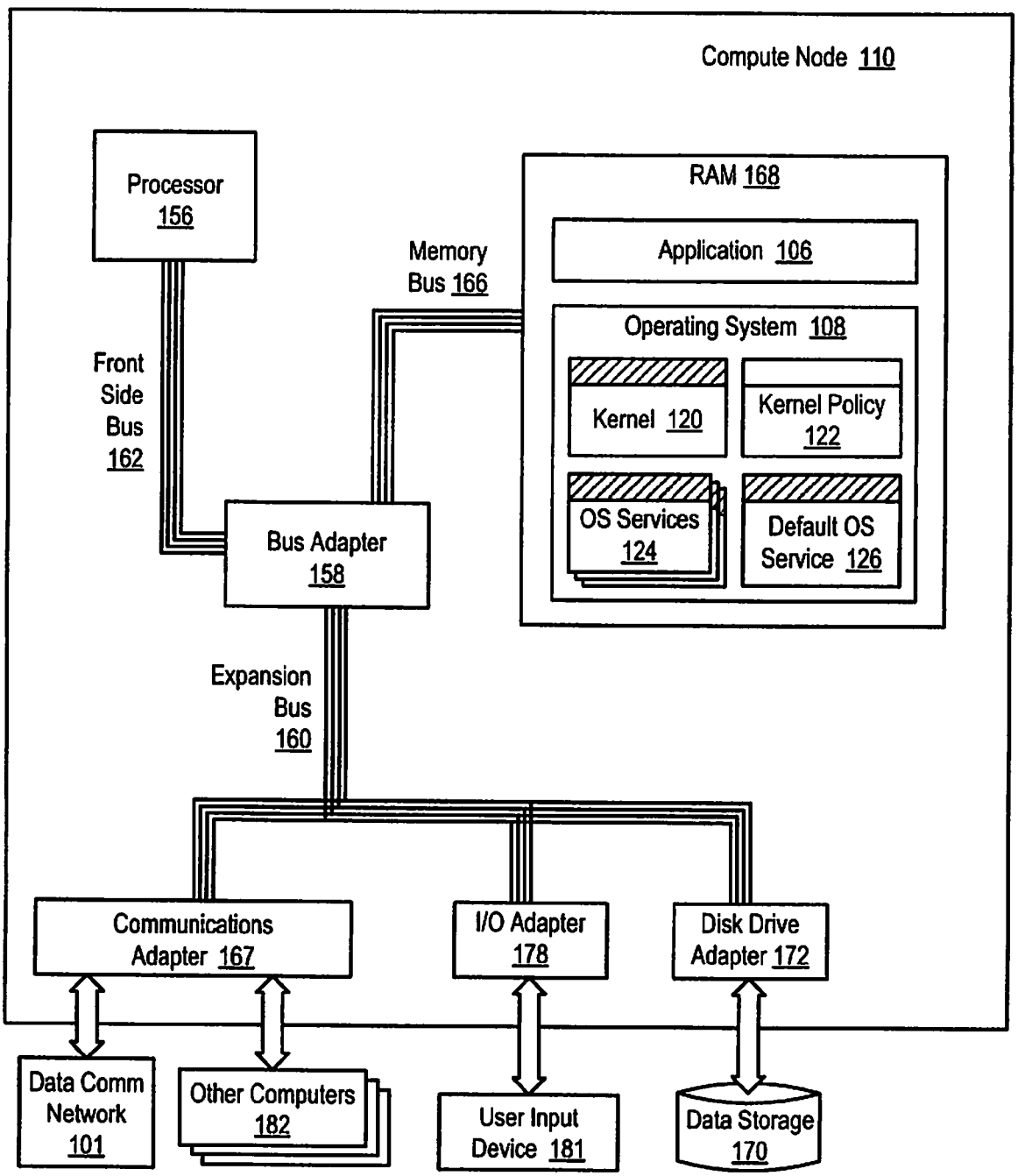
FIG. 2 sets forth a block diagram of automated computing machinery comprising an exemplary compute node useful in providing policy-based operating system services in an operating system on a computing system according to embodiments of the present invention.

Stored in RAM (168) is an application (106) and an operating system (108) that includes a kernel (120), a kernel policy (122), operating system services (124), and default operating system service (126). As mentioned above, the application (106) is a set of computer program instructions implementing user-level data processing. The kernel policy (122) of FIG. 2 is a table that maps one of the operating system services (124) to a type of operating system service used by the kernel (120). The kernel (120), the operating system services (124), and the default operating system service (126) illustrated in FIG. 2 are software components, that is computer program instructions, that operate as described above with reference to FIG. 1 regarding the compute node. Operating systems that may be improved for providing policy-based operating system services in an operating system on a computing system in accordance with the present invention may include UNIX™, LINUX ™, MICROSOFT NT™, IBM's AIX™, IBM's i5/OS™, and others as will occur to those of skill in the art. The application (106) and the operating system (108), including the kernel (120), the kernel policy (122), the operating system services (124), and the default operating system service (126) in the example of FIG. 2 are shown in RAM (168), but many components of such software typically are stored in non-volatile memory also, for example, on a disk drive (170).

The exemplary compute node (110) of FIG. 2 includes bus adapter (158), a computer hardware component that contains drive electronics for high speed buses, the front side bus (162), and the memory bus (166), as well as drive electronics for the slower expansion bus (160). Examples of bus adapters useful in compute nodes useful according to embodiments of the present invention include the Intel Northbridge, the Intel Memory Controller Hub, the Intel Southbridge, and the Intel I/O Controller Hub. Examples of expansion buses useful in compute nodes useful according to embodiments of the present invention may include Peripheral Component Interconnect ('PCI') buses and PCI Express ('PCIe') buses.

Although not depicted in the exemplary compute node (110) of FIG. 2, the bus adapter (158) may also include drive electronics for a video bus that supports data communication between a video adapter and the other components of the compute node (110). FIG. 2 does not depict such video components because a compute node is typically implemented as a blade server installed in a server chassis or a node in a parallel computer with no dedicated video support. Readers will note, however, that a compute node useful in embodiments of the present invention may include such video components.

The exemplary compute node (110) of FIG. 2 also includes disk drive adapter (172) coupled through expansion bus (160) and bus adapter (158) to processor (156) and other components of the exemplary compute node (110). Disk drive adapter (172) connects non-volatile data storage to the exemplary compute node (110) in the form of disk drive (170). Disk drive adapters useful in compute nodes include Integrated Drive Electronics ('IDE') adapters, Small Computer System Interface ('SCSI') adapters, and others as will occur to those of skill in the art. In addition, non-volatile computer memory may be implemented for a compute node as an optical disk drive, electrically erasable programmable read-only memory (so-called 'EEPROM' or 'Flash' memory), RAM drives, and so on, as will occur to those of skill in the art.

The exemplary compute node (110) of FIG. 2 includes one or more input/output ('I/O') adapters (178). I/O adapters in compute node implement user-oriented input/output through, for example, software drivers and computer hardware for controlling output to display devices such as computer display screens, as well as user input from user input devices (181) such as keyboards and mice. Although not depicted in the example of FIG. 2, compute nodes in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus.

The exemplary compute node (110) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing policy-based operating system services in an operating system on a computing system according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to an exemplary compute node, readers will note that automated computing machinery comprising exemplary operating system service nodes and exemplary administration nodes useful in providing policy-based operating system services in an operating system on a computing system according to embodiments of the present invention are similar to the exemplary compute node (110) of FIG. 2. That is, such exemplary operating system service nodes and exemplary administration nodes include one or more processors, bus adapters, buses, RAM, communications adapters, I/O adapters, disk drive adapters, and other components similar to the exemplary compute node (110) of FIG. 2 as will occur to those of skill in the art.

Figure 3:
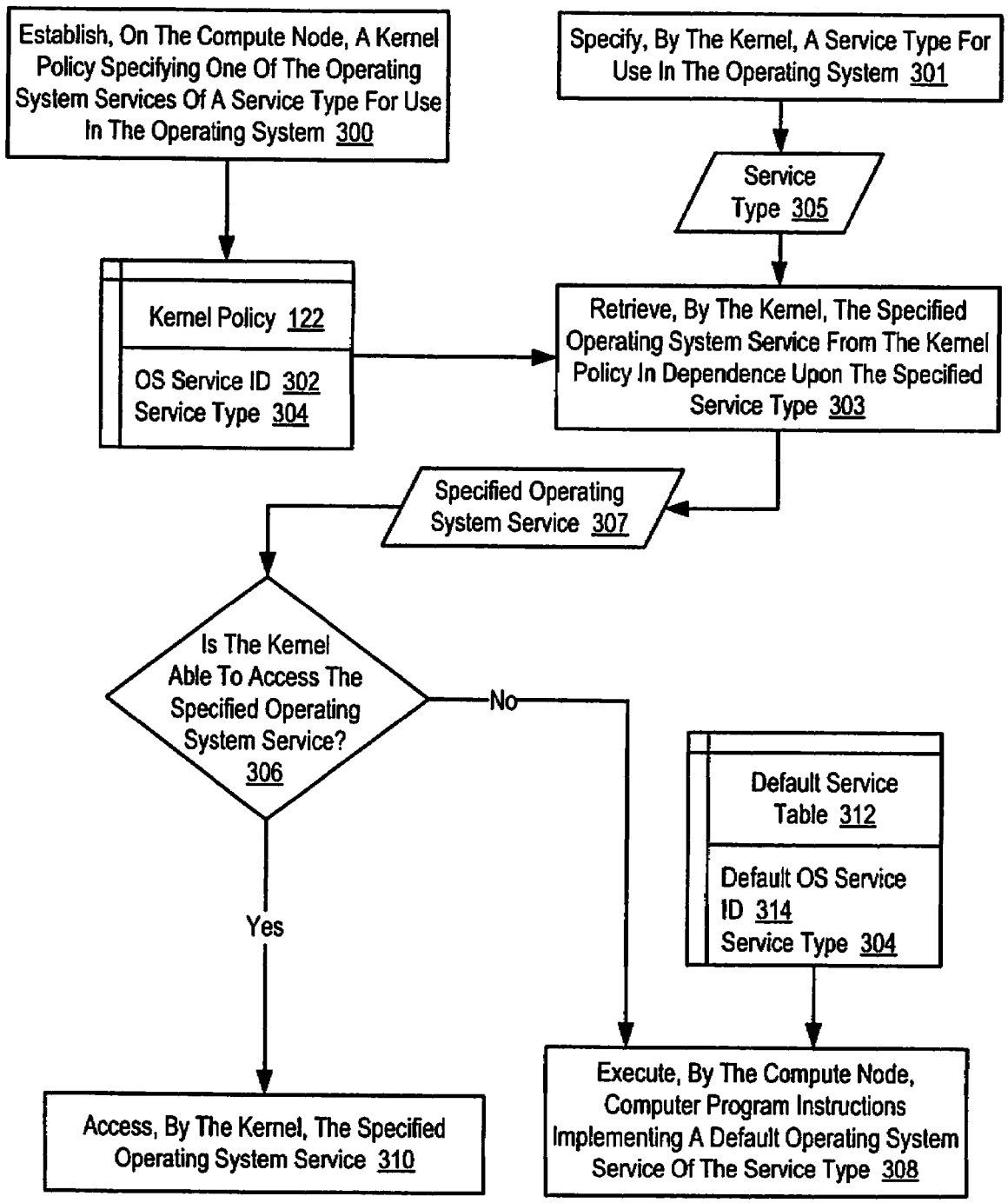
FIG. 3 sets forth a flow chart illustrating an exemplary method for providing policy-based operating system services in an operating system on a computing system according to embodiments of the present invention.

For further explanation, FIG. 3 sets forth a flow chart illustrating an exemplary method for providing policy-based operating system services in an operating system on a computing system according to embodiments of the present invention. The computing system includes at least one compute node. The compute node includes an operating system. The operating system includes a kernel and a plurality of operating system services of a service type.

The method of FIG. 3 includes establishing (300), on the compute node, a kernel policy (122) specifying one of the operating system services of a service type for use in the operating system. The kernel policy (122) of FIG. 3 is a table that maps an operating system service to a type of operating system service used by the kernel. In the example of FIG. 3, each record of the kernel policy (122) identifies which operating system service to use in the operating system for a particular service type. To identify which operating system service to use in the operating system for a particular service type, each record of the kernel policy (122) includes an operating system service identifier (302) and a service type (304). Examples types (304) of operating system services that may be specified in the kernel policy (122) may include task schedulers, file systems, memory management, device drivers, I/O schedulers, interrupt/signal handling, security, job submission, tty handling, and so on. For an example of a kernel policy (122) useful in providing policy-based operating system services in an operating system on a computing system according to embodiments of the present invention, consider the following table:

TABLE 1

Example Kernel Policy

| OS Service ID | Service Type |
| --- | --- |
| UFS_Service | File_System |
| Round_Robin_MM_Algorithm | Memory_Management |
| Limited_I/O_Access | I/O_Scheduler |

In the exemplary kernel policy of Table 1, associating the value 'UFS_Service' for the operating system service identifier (302) with the value 'File_System' for the service type (304) specifies that the kernel use the operating system service that implements the Unix File System when the kernel needs to access a file system service type. Associating the value 'Round_Robin_MM_Algorithm' for the operating system service identifier (302) with the value 'Memory_Management' for the service type (304) specifies that the kernel use the operating system service that implements a round robin algorithm when the kernel need to access a memory management service type. Associating the value 'Limited_I/O_Access' for the operating system service identifier (302) with the value 'I/O_Scheduler' for the service type (304) specifies that the kernel use the operating system service that implements limited I/O access when the kernel uses a I/O scheduler service type. Readers will note that exemplary kernel policy (122) above is for explanation and not for limitation. Other kernel policies as will occur to those of skill in the art may also be useful in providing policy-based operating system services in an operating system on a computing system according to embodiments of the present invention.

In the method of FIG. 3, establishing (300), on the compute node, a kernel policy (122) specifying one of the operating system services of a service type for use in the operating system may be carried out by receiving, in an administration module from a system administrator, a mapping between the operating system services and the service types and creating, by the administration module, the kernel policy (122) on the compute node according to the mappings. The administration module is a software component that the system administration may use to configure the computing system that includes the compute node. The particular compute node on which the administration module creates the kernel policy (122) is typically specified by the system administrator through a user interface provided by the administration module. The administration module may be installed directly on the compute node or any other computer network connected to the compute node. The administration module may create the kernel policy (122) on the compute node through a data communication connection implemented using shared memory space, a CORBA framework, a JTAG network, web services, a MPI library, or any other data communication implementation as will occur to those of skill in the art.

'JTAG' is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient 'back door' into the system. Using a JTAG network, the administration module may efficiently configure processor registers and memory in the compute node for use in providing policy-based operating system services in an operating system on a computing system according to embodiments of the present invention.

The method of FIG. 3 includes specifying (301), by the kernel, a service type (305) for use in the operating system. The kernel may specify (301) a service type (305) for use in the operating system according to the method of FIG. 3 by including an instruction that contains the service type (305) in the computer program instructions implementing the kernel at a particular point along the flow of execution. For example, at a particular point along the flow of execution for the kernel, the computer program instructions implementing the kernel may contain machine code representing the following instruction:

Execute_Service('File_System');

In the exemplary instruction above, the function 'Execute_Service' is a function that instructs the kernel to execute the operating system service specified in the kernel policy (122) for the service type (305) having a value of 'File_System.' Including such an exemplary instruction in the computer program instructions implementing the kernel specifies that the operating system use a service of the file system service type. Readers will note that the exemplary instruction above is for explanation and not for limitation. Other instructions as will occur to those of skill in the art may also be useful in providing policy-based operating system services in an operating system on a computing system according to embodiments of the present invention.

The method of FIG. 3 includes retrieving (303), by the kernel, the specified operating system service (307) from the kernel policy (122) in dependence upon the specified service type (305). Retrieving (303), by the kernel, the specified operating system service (307) from the kernel policy (122) in dependence upon the specified service type (305) according to the method of FIG. 3 may be carried out by looking up in the kernel policy (122) the operating system service identifier (302) associated with the service type (304) having the same value as the specified service type (305).

The method of FIG. 3 also includes determining (306), by the kernel, whether the kernel is able to access the specified operating system service (307). Determining (306), by the kernel, whether the kernel is able to access the specified operating system service (307) according the method of FIG. 3 may be carried out by calling a function of the API for the specified operating system service (307). If the function call returns an error to the kernel, then the kernel is unable to access the specified operating system service. If the function call does not return an error to the kernel, then the kernel is able to access the specified operating system service. As mentioned above, the operating system services for the same service type may have a same application programming interface. The APIs for each service type may be coded into the computer program instructions implementing the kernel.

The method of FIG. 3 includes executing (308), by the compute node, computer program instructions implementing a default operating system service of the service type (304) when the kernel is unable to access the specified operating system service (307). Executing (308), by the compute node, computer program instructions implementing a default operating system service of the service type (304) according to the method of FIG. 3 may be carried out by looking up in a default service table (312) the default operating system service identifier (314) associated with the service type (304) and calling a function of the API for the default operating system service represented by the default operating system service identifier (314). The default service table (312) is similar to the kernel policy (122). Each record of the default service table (312) identifies which default operating system service to use in the operating system for a particular service type. Each record of the default service table (312) includes a default operating system service identifier (314) and a service type (304). Although the default operating system service of FIG. 3 is specified in the default service table (312), readers will note that such an embodiment is for explanation and not for limitation. In other embodiments, the kernel policy (122) may contain a field that specifies the default operating system service for use in the operating system for a particular service type or the default service for each service type may be coded into the kernel itself.

The method of FIG. 3 also includes accessing (310), by the kernel, the specified operating system service (307). Accessing, by the kernel, the specified operating system service (307) according to the method of FIG. 3 may be carried out by calling a function of the API for the specified operating system service (307). Calling a function of the API for the specified operating system service (307) is for explanation only. In another embodiment, an administration module may modify, according to the kernel policy (122), entry and exit hooks in the kernel's code so that processor control is transferred from the kernel to the operating system services at the proper points in the kernel's code during the flow of execution. In such an example, accessing (310) the specified operating system service for a service type may be carried out simply by executing the computer program instructions implementing the kernel.

As mentioned above, operating system services may be distributed among one or more operating system service nodes in a distributed computing system. When the operating system services are distributed among one or more operating system service nodes, accessing (310), by the kernel, the specified operating system service may be carried out by retrieving, from the operating system service node, computer program instructions implementing the specified operating system service, and executing, by the compute node, the computer program instructions implementing the specified operating system service as discussed below with reference to FIG. 5. Accessing (310), by the kernel, the specified operating system service may also be carried out by requesting, by the kernel, that the operating system service node perform the specified operating system service, and executing, by the operating system service node, computer program instructions implementing the specified operating system service as discussed below with reference to FIG. 6.

Figure 4:
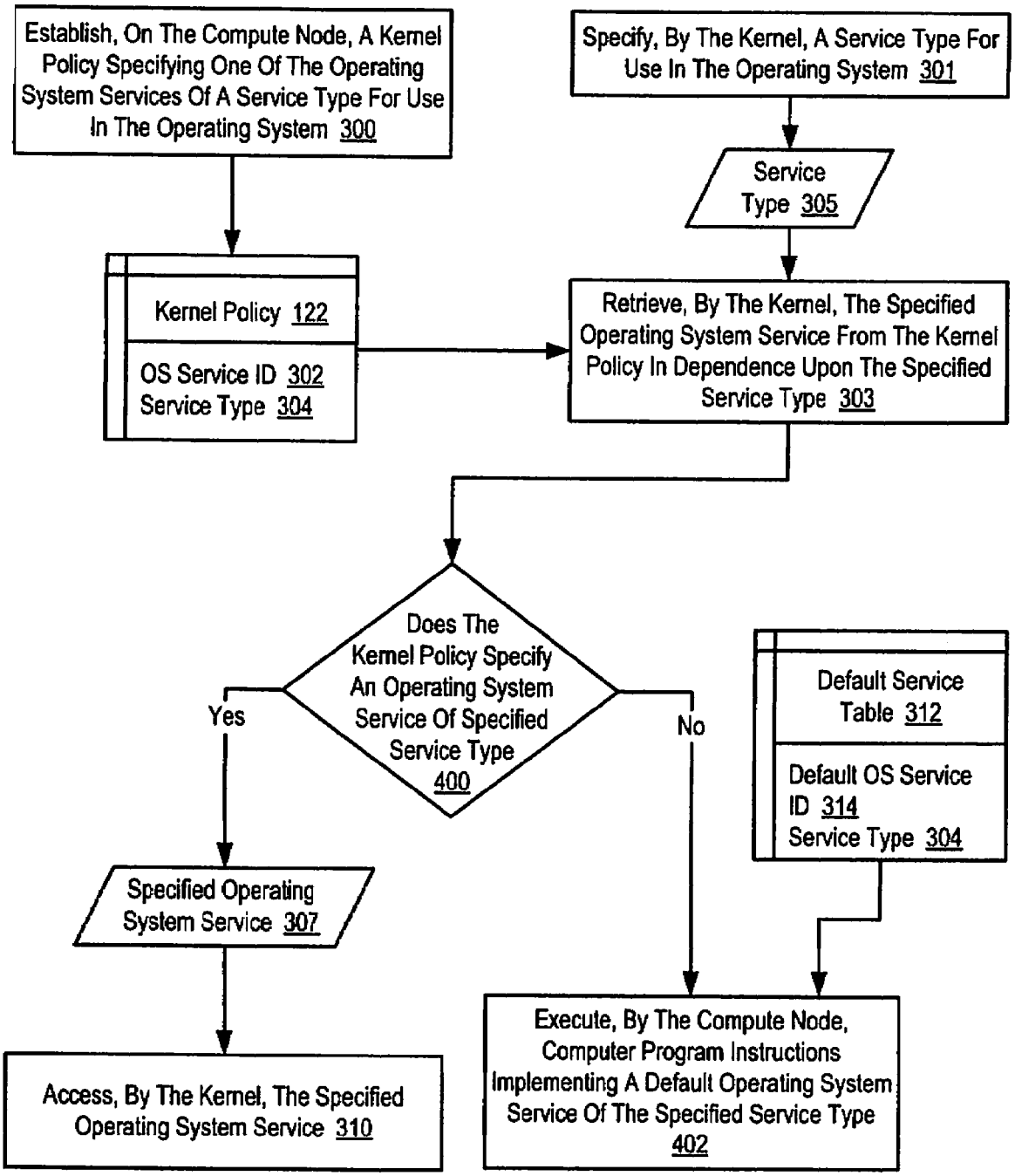
FIG. 4 sets forth a flow chart illustrating a further exemplary method for providing policy-based operating system services in an operating system on a computing system according to embodiments of the present invention.

As mentioned above, the kernel policy is a table that maps a particular operating system service to a type of operating system service used by the kernel. The kernel policy, however, may not map an operating system service to each type of service used by the kernel. As such, the kernel often identifies whether the kernel policy specifies an operating system service for a particular service type and executes computer program instructions implementing a default operating system service of the specified service type if the kernel policy does not specify an operating system service of the specified service type. For further explanation, therefore, FIG. 4 sets forth a flow chart illustrating a further exemplary method for providing policy-based operating system services in an operating system on a computing system according to embodiments of the present invention that includes identifying (400), by the kernel, whether the kernel policy specifies an operating system service of the specified service type (305). In the example of FIG. 4, the computing system includes at least one compute node. The compute node includes an operating system. The operating system includes a kernel and a plurality of operating system services of a service type.

The method of FIG. 4 is similar to the method of FIG. 3 in that the method of FIG. 4 includes establishing (300), on the compute node, a kernel policy (122) specifying one of the operating system services of the service type for use in the operating system, specifying (301), by the kernel, a service type (305) for use in the operating system, retrieving (303), by the kernel, the specified operating system service (307) from the kernel policy (122) in dependence upon the specified service type (305), and accessing (310), by the kernel, the specified operating system service (307). The example of FIG. 4 is also similar to the example of FIG. 3 in that each record of the kernel policy (122) includes an operating system service identifier (302) and a service type (304). In addition, the example of FIG. 4 is similar to the example of FIG. 3 in that the example of FIG. 4 includes a default service table (312) and each record of the table (312) includes a default operating system service identifier (314) and a service type (304).

The method of FIG. 4 includes identifying (400), by the kernel, whether the kernel policy (122) specifies an operating system service of the specified service type (305). Identifying (400), by the kernel, whether the kernel policy (122) specifies an operating system service of the specified service type (305) according to the method of FIG. 4 may be carried out by searching the kernel policy (122) for a record having a value for the service type (304) that matches the value for the specified service type (305). If no record is found, then the kernel policy (122) does not specify an operating system service of the specified service type (305). If a record is found, then the kernel policy (122) does specify an operating system service of the specified service type (305). Readers will note that identifying (400) whether the kernel policy (122) specifies an operating system service of the specified service type (305) by searching the kernel policy (122) for a record having a value for the service type (304) that matches the value for the specified service type (305) is for explanation and not for limitation. In other embodiments of the present invention, the kernel policy (122) may contain a record for each service type for use in the operating system. In such embodiments, identifying (400) whether the kernel policy (122) specifies an operating system service of the specified service type (305) may be carried out by identifying whether the operating system service identifier (302) for a particular record in the kernel policy (122) contains a NULL value.

The method of FIG. 4 also includes executing (402), by the compute node, computer program instructions implementing a default operating system service of the specified service type (305) when the kernel policy (122) does not specify an operating system service of the specified service type (305). Executing (402), by the compute node, computer program instructions implementing a default operating system service of the specified service type (305) according to the method of FIG. 4 may be carried out by looking up in a default service table (312) the default operating system service identifier (314) associated with the service type (304) and calling a function of the API for the default operating system service represented by the default operating system service identifier (314). Although the default operating system service of FIG.

4 is specified in the default service table (312), readers will note that such an embodiment is for explanation and not for limitation. In other embodiments, the kernel policy (122) may contain a field that specifies the default operating system service for use in the operating system for a particular service type or the default service for each service type may be coded into the kernel itself.

Figure 5:
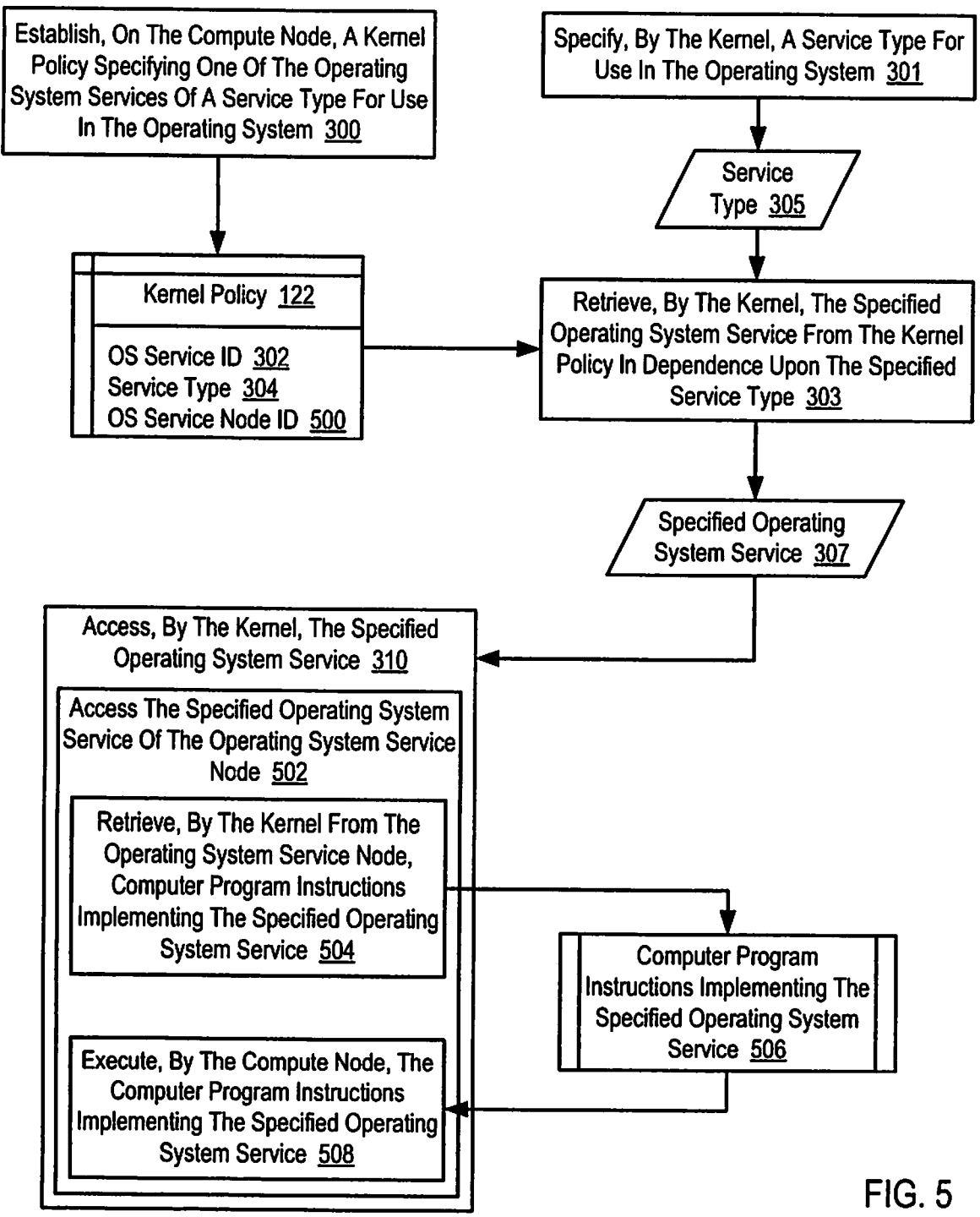
FIG. 5 sets forth a flow chart illustrating a further exemplary method for providing policy-based operating system services in an operating system on a computing system according to embodiments of the present invention.

As mentioned above, operating system services may be distributed among one or more operating system service nodes in a distributed computing system. When the operating system services are distributed among one or more operating system service nodes, accessing, by the kernel, the specified operating system service may be carried out by accessing the specified operating system service of the operating system service node. For further explanation, therefore, FIG. 5 sets forth a flow chart illustrating a further exemplary method for providing policy-based operating system services in an operating system on a computing system according to embodiments of the present invention that includes accessing (502) the specified operating system service (507) of the operating system service node. In the example of FIG. 5, the computing system includes at least one compute node and one or more operating system service nodes. The compute node includes an operating system. The operating system includes a kernel and a plurality of operating system services of one service type. In the example of FIG. 5, one or more of the operating system services are distributed among the operating system service nodes.

The method of FIG. 5 is similar to the method of FIG. 3 in that the method of FIG. 5 includes establishing (300), on the compute node, a kernel policy (122) specifying one of the operating system services of the service type for use in the operating system, specifying (301), by the kernel, a service type (305) for use in the operating system, retrieving (303), by the kernel, the specified operating system service (307) from the kernel policy (122) in dependence upon the specified service type (305), and accessing (310), by the kernel, the specified operating system service (307). The example of FIG. 5 is also similar to the example of FIG. 3 in that each record of the kernel policy (122) includes an operating system service identifier (302) and a service type (304). In the example of FIG. 5, however, the kernel policy (122) also specifies an operating system service node that is to provide the specified operating system service (307) by including an operating system service node identifier (500) in each record. In the example of FIG. 5, the specified operating system service (307) is distributed on one of the operating system service nodes.

In the method of FIG. 5, accessing (310), by the kernel, the specified operating system service (307) includes accessing (502) the specified operating system service (307) of the operating system service node. Accessing (502) the specified operating system service (307) of the operating system service node according to the method of FIG. 5 is carried out by retrieving (504), by the kernel from the operating system service node, computer program instructions (506) implementing the specified operating system service (307). The computer program instructions (506) represent machine code implementing the specified operating system service (307). Although the computer program instructions (506) of FIG. 5 represent machine code, such a representation is for explanation and not for limitation. In fact, the computer program instructions (506) of FIG. 5 may also represent computer program instructions implemented in an assembly language or a high-level language such as, for example, Java.

Retrieving (504), by the kernel from the operating system service node, computer program instructions (506) implementing the specified operating system service (307) according to the method of FIG. 5 may be carried out by transmitting an operating system service request to a service server on the operating system service node on which the specified operating system service (307) is distributed and receiving, from the service server, the computer program instructions (506) implementing the specified operating system service. The operating system service request is a request for an operating system service node to provide an operating system service to the kernel. The operating system service request may include the operating system service identifier (302) for the specified operating system service (307). The kernel may transmit the operating system service request to a service server on an operating system service node and retrieve the computer program instructions (506) using web services, by calling a member method of a CORBA object, using an MPI library, or any other data communications implementation as will occur to those of skill in the art.

Accessing (502) the specified operating system service (307) of the operating system service node according to the method of FIG. 5 is also carried out by executing (508), by the compute node, the computer program instructions (506) implementing the specified operating system service (507). Executing (508), by the compute node, the computer program instructions (506) implementing the specified operating system service (507) according to the method of FIG. 5 may be carried out by scheduling the computer program instructions (506) implementing the specified operating system service (507) for execution on the compute node. As mentioned above, the computer program instructions (506) of FIG. 5 may represent computer program instructions implemented in an assembly language or a high-level language such as, for example, Java. In such an embodiment, executing (508) the computer program instructions (506) implementing the specified operating system service (507) may be carried out by interpreting the computer program instructions (506) into machine code and scheduling the machine code for execution on the compute node.

Figure 6:
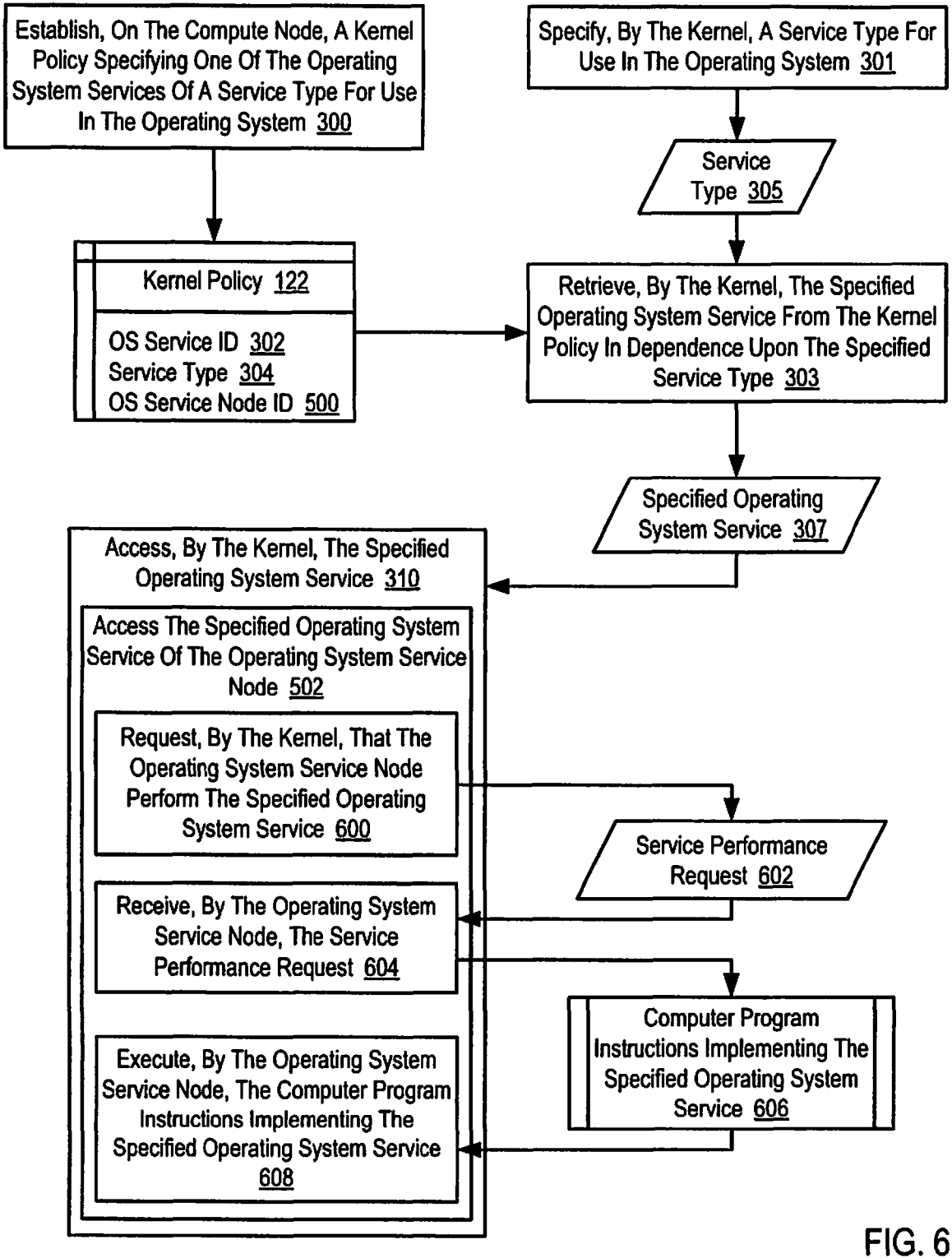
FIG. 6 sets forth a flow chart illustrating a further exemplary method for providing policy-based operating system services in an operating system on a computing system according to embodiments of the present invention

In the method of FIG. 5, accessing the specified operating system service of the operating system service node is carried out by executing the computer program instructions implementing the specified operating system service on the compute node. Accessing the specified operating system service of the operating system service node, however, may also be carried out by executing the computer program instructions implementing the specified operating system service on the operating system service node. For further explanation, therefore, FIG. 6 sets forth a flow chart illustrating a further exemplary method for providing policy-based operating system services in an operating system on a computing system according to embodiments of the present invention that includes executing (608), by the operating system service node, computer program instructions (606) implementing the specified operating system service (307). In the example of FIG. 6, the computing system includes at least one compute node and one or more operating system service nodes. The compute node includes an operating system. The operating system includes a kernel and a plurality of operating system services of one service type. In the example of FIG. 6, one or more of the operating system services are distributed among the operating system service nodes.

The method of FIG. 6 is similar to the method of FIG. 3 in that the method of FIG. 6 includes establishing (300), on the compute node, a kernel policy (122) specifying one of the operating system services of the service type for use in the operating system, specifying (301), by the kernel, a service type (305) for use in the operating system, retrieving (303), by the kernel, the specified operating system service (307) from the kernel policy (122) in dependence upon the specified service type (305), and accessing (310), by the kernel, the specified operating system service (307). The example of FIG. 6 is also similar to the example of FIG. 3 in that each record of the kernel policy (122) includes an operating system service identifier (302) and a service type (304). In the example of FIG. 6, however, the kernel policy (122) also specifies an operating system service node that is to provide the specified operating system service (307) by including an operating system service node identifier (500) in each record. In the example of FIG. 6, the specified operating system service (307) is distributed on one of the operating system service nodes.

In the method of FIG. 6, accessing (310), by the kernel, the specified operating system service (307) includes accessing (502) the specified operating system service (307) of the operating system service node. Accessing (502) the specified operating system service (307) of the operating system service node according to the method of FIG. 6 is carried out by requesting (600), by the kernel, that the operating system service node perform the specified operating system service and receiving (604), by the operating system service node, the service performance request (602). Requesting (600), by the kernel, that the operating system service node perform the specified operating system service may be carried out by transmitting a service performance request (602) to a service server on the operating system service node on which the specified operating system service (307) is distributed. The service performance request (602) is a request for an operating system service node to perform an operating system service for the kernel. The service performance request (602) may include the operating system service identifier (302) for the specified operating system service (307). The kernel may transmit the service performance request (602) to a service server on an operating system service node using web services, by calling a member method of a CORBA object, using an MPI library, or any other data communications implementation as will occur to those of skill in the art.

Accessing (502) the specified operating system service (307) of the operating system service node according to the method of FIG. 6 is also carried out by executing (608), by the operating system service node, computer program instructions (606) implementing the specified operating system service (307). The computer program instructions (606) represent machine code implementing the specified operating system service (307). Executing (608), by the operating system service node, computer program instructions (606) implementing the specified operating system service (307) according to the method of FIG. 6 may be carried out by scheduling the computer program instructions (606) implementing the specified operating system service (507) for execution on the operating system service node. After executing the computer program instructions (606), the service server on the operating system service node may transmit a message to the kernel indicating whether the execution was successful.

In view of the explanations set forth above in this document, readers will recognize that providing policy-based operating system services in an operating system on a computing system according to embodiments of the present invention provides the following benefits:

the ability to configure operating system services used in an operating system based upon the hardware and software environment managed by the operating system, and the ability to adapt an operating system to a new environment or to meet new requirements by providing a variety of operating system services for use by the kernel of the operating system.

Exemplary embodiments of the present invention are described largely in the context of a fully functional computing system for providing policy-based operating system services in an operating system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing policy-based operating system services in an operating system on a computing system, the computing system comprising at least one compute node, the compute node comprising an operating system, the operating system further comprising a kernel and a plurality of operating system services of a service type, the operating system including computer program instructions capable of carrying out the method, the method comprising:

establishing, on the compute node, a kernel policy specifying one of the operating system services of the service type for use in the operating system in dependence upon the hardware and software environment managed by the operating system; and retrieving the specified operating system service from the kernel policy in dependence upon the specified service type;

determining, by the kernel, whether the kernel is able to access the specified operating system service; and accessing, by the kernel, the specified operating system service if the kernel is able to access the specified operating system service; and executing, by the compute node, computer program instructions implementing a default operating system service of the service type if the kernel is unable to access the specified operating system service.

2. The method of claim 1 wherein:
- the computing system is a distributed computing system further comprising one or more operating system service nodes;
- one or more of the operating system services are distributed among the operating system service nodes;
- the kernel policy also specifies an operating system service node that is to provide the specified operating system service; and
- accessing, by the kernel, the specified operating system service further comprises accessing, by the kernel, the specified operating system service of the operating system service node.

3. The method of claim 2 wherein accessing, by the kernel of the compute node, the specified operating system service of the operating system service node further comprises:
- retrieving, by the kernel from the operating system service node, computer program instructions implementing the specified operating system service; and
- executing, by the compute node, the computer program instructions implementing the specified operating system service.

4. The method of claim 2 wherein accessing, by the kernel of the compute node, the specified operating system service of the operating system service node further comprises:
- requesting, by the kernel, that the operating system service node perform the specified operating system service; and
- executing, by the operating system service node, computer program instructions implementing the specified operating system service.

5. The method of claim 1 wherein the operating system further comprises an operating system service of an other service type, the method further comprising:
- identifying, by the kernel, whether the kernel policy specifies an operating system service of the other service type; and
- executing, by the compute node, computer program instructions implementing a default operating system service of the other service type if the kernel policy does not specify an operating system service of the other service type.

6. The method of claim 1 wherein:
- the operating system services for the service type have a same application programming interface; and
- accessing, by the kernel of the compute node, the specified operating system service further comprises accessing the specified operating system service using the same application programming interface for the service type of the specified operating system service.

7. The method of claim 1 wherein the computing system is a parallel computer.

8. A computing system for providing policy-based operating system services in an operating system, the computing system comprising at least one compute node, the compute node comprising an operating system, the operating system further comprising a kernel and a plurality of operating system services of a service type, the computing system further comprising computer processors and computer memory operatively coupled to the computer processors, the computer memory also having disposed within it computer program instructions capable of:
- establishing, on the compute node, a kernel policy specifying one of the operating system services of the service type for use in the operating system in dependence upon the hardware and software environment managed by the operating system; and
- retrieving the specified operating system service from the kernel policy in dependence upon the specified service type;
- determining, by the kernel, whether the kernel is able to access the specified operating system service; and
- accessing, by the kernel, the specified operating system service if the kernel is able to access the specified operating system service; and
- executing, by the compute node, computer program instructions implementing a default operating system service of the service type if the kernel is unable to access the specified operating system service.

9. The computing system of claim 8 wherein:
- the computing system is a distributed computing system further comprising one or more operating system service nodes;
- one or more of the operating system services are distributed among the operating system service nodes;
- the kernel policy also specifies an operating system service node that is to provide the specified operating system service; and
- accessing, by the kernel, the specified operating system service further comprises accessing, by the kernel, the specified operating system service of the operating system service node.

10. The computing system of claim 9 wherein accessing, by the kernel of the compute node, the specified operating system service of the operating system service node further comprises:
- retrieving, by the kernel from the operating system service node, computer program instructions implementing the specified operating system service; and
- executing, by the compute node, the computer program instructions implementing the specified operating system service.

11. The computing system of claim 9 wherein accessing, by the kernel of the compute node, the specified operating system service of the operating system service node further comprises:
- requesting, by the kernel, that the operating system service node perform the specified operating system service; and
- executing, by the operating system service node, computer program instructions implementing the specified operating system service.

12. A computer program product for providing policy-based operating system services in an operating system on a computing system, the computing system comprising at least one compute node, the compute node comprising an operating system, the operating system further comprising a kernel and a plurality of operating system services of a service type, the computer program product disposed upon a computer readable recordable medium, the computer program product comprising computer program instructions capable of:
- establishing, on the compute node, a kernel policy specifying one of the operating system services of the service type for use in the operating system in dependence upon the hardware and software environment managed by the operating system; and
- retrieving the specified operating system service from the kernel policy in dependence upon the specified service type;
- determining, by the kernel, whether the kernel is able to access the specified operating system service: and
- accessing, by the kernel, the specified operating system service if the kernel is able to access the specified operating system service; and executing, by the compute node, computer program instructions implementing a default operating system service of the service type if the kernel is unable to access the specified operating system service.

13. The computer program product of claim 12 wherein:
the computing system is a distributed computing system further comprising one or more operating system service nodes;
one or more of the operating system services are distributed among the operating system service nodes;
the kernel policy also specifies an operating system service node that is to provide the specified operating system service; and
accessing, by the kernel, the specified operating system service further comprises accessing, by the kernel, the specified operating system service of the operating system service node.

14. The computer program product of claim 13 wherein accessing, by the kernel of the compute node, the specified operating system service of the operating system service node further comprises:
retrieving, by the kernel from the operating system service node, computer program instructions implementing the specified operating system service; and
executing, by the compute node, the computer program instructions implementing the specified operating system service.

15. The computer program product of claim 13 wherein accessing, by the kernel of the compute node, the specified operating system service of the operating system service node further comprises:
requesting, by the kernel, that the operating system service node perform the specified operating system service; and
executing, by the operating system service node, computer program instructions implementing the specified operating system service.

16. The computer program product of claim 12 wherein the operating system further comprises an operating system service of an other service type, the computer program product further comprising computer program instructions capable of:
identifying, by the kernel, whether the kernel policy specifies an operating system service of the other service type; and
executing, by the compute node, computer program instructions implementing a default operating system service of the other service type if the kernel policy does not specify an operating system service of the other service type.

* * * * *